United States Patent [19]
Kuhn et al.
[11] Patent Number: 4,975,317
[45] Date of Patent: Dec. 4, 1990

[54] ELECTRICALLY CONDUCTIVE TEXTILE MATERIALS AND METHOD FOR MAKING SAME

[75] Inventors: Hans H. Kuhn, Spartanburg; William C. Kimbrell, Jr., Inman, both of S.C.

[73] Assignee: Milliken Research Corporation, Spartanburg, S.C.

[21] Appl. No.: 367,276

[22] Filed: Jun. 16, 1989

Related U.S. Application Data

[60] Continuation-in-part of Ser. No. 175,783, Mar. 31, 1988, abandoned, which is a division of Ser. No. 81,069, Aug. 3, 1987, Pat. No. 4,803,096.

[51] Int. Cl.[5] ........................ B32B 27/06; B32B 27/28; B32B 33/00; D06M 15/61

[52] U.S. Cl. ...................................... 428/253; 427/58; 427/389.9; 428/265; 428/267; 428/268; 428/288; 428/290; 428/335; 428/336; 428/361; 428/377; 428/378; 428/392; 428/394; 428/395

[58] Field of Search ............... 427/58, 389.9; 428/253, 428/265, 267, 268, 288, 290, 335, 336, 361, 377, 378, 392, 394, 395

[56] References Cited

U.S. PATENT DOCUMENTS

| | | | |
|---|---|---|---|
| 4,521,450 | 6/1985 | Bjorklund | 427/121 |
| 4,604,427 | 8/1986 | Roberts | 252/500 |
| 4,617,222 | 10/1986 | Newman | 428/265 |
| 4,696,835 | 9/1987 | Maus | 428/121 |

*Primary Examiner*—James C. Cannon
*Attorney, Agent, or Firm*—Timothy J. Monahan; H. William Petry

[57] ABSTRACT

Fabrics are made electrically conductive by contacting the fabric under agitation conditions with an aqueous solution of a pyrrole or aniline compound, and an oxidizing agent and a doping agent or counter ion; and then epitaxially depositing onto the surface of the individual fibers of said fabric the in status nascendi forming polymer of the pyrrole or aniline compound so as to uniformly and coherently cover the fibers with an ordered conductive film of the polymerized pyrrole or aniline compound. Individual fibers and yarns can be similarly treated and then formed into fabrics. Products made by the process are also described.

13 Claims, 7 Drawing Sheets

POLYPYRROLE ON QUARTZ FABRIC

POLYPYRROLE (LOOSE POWER)

ELECTRICALLY CONDUCTIVE TEXTILE MATERIALS AND METHOD FOR MAKING SAME

This is a continuation-in-part of copending U.S. Ser. No. 07/175,783, filed Mar. 31, 1988, and now abandoned, which in turn is a division of Ser. No. 07/081,069, filed Aug. 3, 1987, now U.S. Pat. No. 4,803,096.

The present invention relates to a method for imparting electrical conductivity to textile materials and to products made by such a method. More particularly, the present invention relates to a method for producing conductive textile materials, such as fabrics, filaments, fibers, yarns, by depositing in status nascendi forming, electrically conducting polymers, such as polypyrrole or polyaniline, epitaxially onto the surface of the textile material.

Electrically conductive fabrics have, in general, been known for some time. Such fabrics have been manufactured by mixing or blending a conductive powder with a polymer melt prior to extrusion of the fibers from which the fabric is made. Such powders may include, for instance, carbon black, silver particles or even silver- or gold-coated particles. When conductive fabrics are made in this fashion, however, the amount of powder or filler required may be relatively high in order to achieve any reasonable conductivity and this high level of filler may adversely affect the properties of the resultant fibers. It is theorized that the high level of filler is necessitated because the filler particles must actually touch one another in order to obtain the desired conductivity characteristics for the resultant fabrics.

Such products have, as mentioned briefly above, some significant disadvantages. For instance, the mixing of a relatively high concentration of particles into the polymer melt prior to extrusion of the fibers may result in undesired alteration of the physical properties of the fibers and the resultant textile materials.

Antistatic fabrics may also be made by incorporating conductive carbon fibers, or carbon-filled nylon or polyester fibers in woven or knit fabrics. Alternatively, conductive fabrics may be made by blending stainless steel fibers into spun yarns used to make such fabrics. While effective for some applications, these "black stripe" fabrics and stainless steel containing fabrics are expensive and of only limited use. Also known are metal-coated fabrics such as nickel-coated, copper-coated and noble metal-coated fabrics, however the process to make such fabrics is quite complicated and involves expensive catalysts such as palladium or platinum, making such fabrics impractical for many applications.

It is known that polypyrrole may be a convenient material for achieving electrical conductivity for a variety of uses. An excellent summary in this regard is provided in an article by G. Bryan Street of IBM Research Laboratories Volume 1, "Handbook of Conductive Polymers", pages 266–291. As mentioned in that article, polypyrrole can be produced by either an electrochemical process where pyrrole is oxidized on an anode to a desired polymer film configuration or, alternatively, pyrrole may be oxidized chemically to polypyrrole by ferric chloride or other oxidizing agents. While conductive films may be obtained by means of these methods, the films themselves are insoluble in either organic or inorganic solvents and, therefore, they cannot be reformed or processed into desirable shapes after they have been prepared.

Accordingly, it has been suggested that the polypyrrole may be made more soluble in organic solvents by providing one or two aliphatic side chains on a pyrrole molecule. More recently, it has been suggested that the pyrrole may be polymerized by a chemical oxidation within a film or fiber (see U.S. Pat. No. 4,604,427 to A. Roberts, et al.). A somewhat similar method has been suggested wherein ferric chloride is incorporated into, for instance, a polyvinyl alcohol film and the composite is then exposed to pyrrole vapors resulting in a conductive polymeric composite.

Another method for making polypyrrole products is described in U.S. Pat. No. 4,521,450 to Bjorklund, et al. wherein it is suggested that the oxidizing catalyst be applied to a fiber composite and thereafter exposed to the pyrrole monomer in solution or vapor form. A closely related process for producing electrically conductive composites by precipitating conductive pyrrole polymer in the interstitial pores of a porous substance is disclosed in U.S. Pat. No. 4,617,228 to Newman, et al.

However, while the examples of the aforementioned patents to Roberts, et al., Bjorklund, et al. and Newman, et al. show increased conductivity for various non-porous synthetic organic polymer films, impregnable cellulosic fabrics, and porous substances, respectively, these processes each have various drawbacks. For example, they require relatively high concentrations of the pyrrole compound applied to the host substrate. Another problem inherent to these processes is the requirement for separate applications of pyrrole monomer and oxidant, with one or the other first being taken up by the fabric, film, fiber, etc. and then the other reactant being applied to the previously impregnated host material. This dual step approach may involve additional handling, require drying between steps, involve additional time for first impregnation and then reaction. The process of Bjorklund, et al. as pointed out by Roberts, et al. has the additional deficiency of not being applicable to non-porous polymeric materials. On the other hand, the Roberts, et al. process requires use of organic solvents in which the pyrrole or substituted pyrrole analog is soluble, thus requiring handling and recovery of the organic solvent with the corresponding environmental hazards associated with organic solvents. Still further, it is, in practice, difficult to control the amount of conductive polymer deposited in or on the substrate material and may result in non-uniform coatings, loosely adherent polypyrrole ("pyrrole black") and inefficient use or waste of the pyrrole monomer. Furthermore, as will be shown hereinafter, under the conditions used to effect epitaxial deposition of the in status nascendi forming polymer of pyrrole or aniline, the presence of organic solvents interferes with the deposition and prevents formation of an electrically conductive film on the textile material.

On the other hand the electrochemical deposition of polypyrrole on the surface of textiles could only be achieved if these fabrics would be per se electrically conductive. H. Naarmann, et al. describes such a process in DE 3,531,019A using electrically conductive carbon fibers or fabrics as the anode for the electrochemical formation of polypyrrole. It is obvious that such a process would be inoperative on regular textiles which are predominantly insulators or not sufficiently conductive to provide the necessary electrical potential to initiate polymerization.

Another conductive polymer which can be obtained by an oxidative polymerization from an aqueous solution and which has similar properties to polypyrrole is polyaniline. Such products are described in a paper by Wu-Song Huang, et al. In the Am Chem. Soc. Faraday Trans. 1, 1986 82, 2385–2400. As will be shown later herein, polyaniline can be epitaxially deposited in the in status nascendi form to the surface of textile materials resulting in conductive textile materials much like the corresponding materials made from pyrrole and its derivatives.

It is thus an object of the present invention to overcome the difficulties associated with known methods for preparing conductive materials and to produce a highly conductive, ordered, coherent film on the surface of textile materials. Such resultant textile materials may, in general, include fibers, filaments, yarns and fabrics. The treated textile materials exhibit excellent hand characteristics which make them suitable and appropriate for a variety of end use applications where conductivity may be desired including, for example, antistatic garments, antistatic floor coverings, components in computers, and generally, as replacements for metallic conductors, or semiconductors, including such specific applications as, for example, batteries, photovoltaics, electrostatic dissipation and electromagnetic shielding, for example, as antistatic wrappings of electronic equipment or electromagnetic interference shields for computers and other sensitive instruments.

According to one embodiment of the present invention, a method is provided for imparting electrical conductivity to textile materials by contacting the textile material with an aqueous solution of an oxidatively polymerizable compound selected from pyrrole and aniline and their derivatives and an oxidizing agent capable of oxidizing said compound to a polymer, said contacting being carried out in the presence of a counter ion or doping agent to impart electrical conductivity to said polymer, and under conditions at which the polymerizable compound and the oxidizing agent react with each other to form an in status nascendi forming polymer in said aqueous solution, but without forming a conductive polymer, per se, in said aqueous solution and without either the compound or the oxidizing agent being adsorbed by, or deposited on or in, the textile material; epitaxially depositing onto the surface of the textile material the in status nascendi forming polymer of the polymerizable compound; and allowing the in status nascendi forming compound to polymerize while deposited on the textile material so as to uniformly and coherently cover the textile material with an ordered, conductive film of polymerized compound.

According to another embodiment of the present invention an electrically conductive textile material is provided which comprises a textile material onto which is epitaxially deposited a film of an electrically conductive polymer.

The process of the present invention differs significantly from the prior art methods for making conductive composites in that the substrate being treated is contacted with the polymerizable compound and oxidizing agent at relatively dilute concentrations and under conditions which do not result in either the monomer or the oxidizing agent being taken up, whether by adsorption, impregnation, absorption, or otherwise, by the preformed fabric (or the fibers, filaments or yarns forming the fabric). Rather, the polymerizable monomer and oxidizing reagent will first react with each other to form a "pre-polymer" species, the exact nature of which has not yet been fully ascertained, but which may be a water-soluble or dispersible free radical-ion of the compound, or a water-soluble or dispersible dimer or oligomer of the polymerizable compound, or some other unidentified "pre-polymer" species. In any case, it is the "pre-polymer" species, i.e. the in status nascendi forming polymer, which is epitaxially deposited onto the surface of the individual fibers or filaments, as such, or as a component of yarn or preformed fabric or other textile material. Thus, applicant controls process conditions, such as reaction temperature, concentration of reactants and textile material, and other process conditions so as to result in epitaxial deposition of the pre-polymer particles being formed in the in status nascendi phase, that is, as they are being formed. This results in a very uniform film being formed at the surface of individual fibers or filaments without any significant formation of polymer in solution and also results in optimum usage of the polymerizable compound so that even with a relatively low amount of pyrrole or aniline applied to the surface of the textile, nonetheless a relatively high amount of conductivity is capable of being achieved.

The invention will now be explained in greater detail with the aid of specific embodiments and the accompanying drawings forming a part of this application.

As mentioned briefly above it is the in status nascendi forming compound that is epitaxially deposited onto the surface of the textile material. As used herein the phrase "epitaxially deposited" means deposition of a uniform, smooth, coherent and "ordered" film. This epitaxial deposition phenomenon may be said to be related to, or a species of, the more conventionally understood adsorption phenomenon. While the adsorption phenomenon is not necessarily a well known phenomenon in terms of textile finishing operations it certainly has been known that monomeric materials may be adsorbed to many substrates including textile fabrics. The adsorption of polymeric materials from the liquid phase onto a solid surface is a phenomenon which is known, to some extent, especially in the field of biological chemistry. For example, reference is made to U.S. Pat. No. 3,909,195 to Machell, et al. and U.S. Pat. No. 3,950,589 to Togo, et al. which show methods for treating textile fibers with polymerizable compositions, although not in the context of electrically conductive fibers.

Epitaxial deposition of the in status nascendi forming pre-polymer of either pyrrole or aniline is caused to occur, according to the present invention, by, among other factors, controlling the type and concentration of polymerizable compound in the aqueous reaction medium. If the concentration of polymerizable compound (relative to the textile material and/or aqueous phase) is too high, polymerization may occur virtually instantaneously both in solution and on the surface of the textile material and a black powder, e.g. "black polypyrrole", will be formed and settle on the bottom of the reaction flask. If, however, the concentration of polymerizable compound, in the aqueous phase and relative to the textile material, is maintained at relatively low levels, for instance, depending on the particular oxidizing agent, from about 0.01 to about 5 grams of polymerizable compound per 50 grams of textile material in one liter of aqueous solution, preferably from about 1.5 to about 2.5 grams polymerizable compound per 50 grams textile per liter, polymerization occurs at a sufficiently slow rate, and the pre-polymer species will be epitaxially deposited onto the textile material before polymerization is completed. Reaction rates may be further controlled by variations in other reaction conditions such as reaction temperatures, etc. and other additives This rate is, in fact, sufficiently slow that it may take several minutes, for example 2 to 5 minutes or longer , until a significant change in the appearance of the reaction solution is observed. If a textile material is present in this in status nascendi forming solution of pre-polymer, the forming species, while still in solution, or in colloidal suspension will be epitaxially deposited onto the surface of the textile material and a uniformly coated textile material having a thin, coherent, and ordered conductive polymer film on its surface will be obtained.

In general, the amount of textile material per liter of aqueous liquor may be from about 1 to 5 to 1 to 50 preferably from about 1 to 10 to about 1 to 20.

Controlling the rate of the in status nascendi forming polymer deposition epitaxially on the surface of the fibers in the textile material is not only of importance for controlling the reaction conditions to optimize yield and proper formation of the polymer on the surface of the individual fiber but foremost influences the molecular weight and order of the epitaxially deposited polymer. Higher molecular weight and higher order in electrically conductive polymers imparts higher conductivity and most importantly higher stability to these products.

Pyrrole is the preferred pyrrole monomer, both in terms of the conductivity of the doped polypyrrole films and for its reactivity. However, other pyrrole monomers, including N-methylpyrrole, 3-methylpyrrole, 3,5-dimethylpyrrole, 2,2'-bipyrrole, and the like, especially N-methylpyrrole can also be used. More generally, the pyrrole compound may be selected from pyrrole, 3-, and 3,4-alkyl and aryl substituted pyrrole, and N-alkyl, and N-aryl pyrrole. In addition, two or more pyrrole monomers can be used to form conductive copolymer, especially those containing predominantly pyrrole, especially at least 50 mole percent, preferably at least 70 mole percent, and especially preferably at least 90 mole percent of pyrrole. In fact, the addition of a pyrrole derivative as comonomer having a lower polymerization reaction rate than pyrrole may be used to effectively lower the overall polymerization rate. Use of other pyrrole monomers, is, however, not preferred, particularly when especially low resistivity is desired, for example, below about 1,000 ohms per square.

In addition to pyrrole compounds, it has been found that aniline under proper conditions can form a conductive film on the surface of textiles much like the pyrrole compounds mentioned above. Aniline is a very desirable monomer to be used in this expitaxial deposition of an in status nascendi forming polymer, not only for its low cost, but also because of the excellent stability of the conductive polyaniline formed.

Any of the known oxidizing agents for promoting the polymerization of polymerizable monomers may be used in this invention, including, for example, the chemical oxidants and the chemical compounds containing a metal ion which is capable of changing its valence, which compounds are capable, during the polymerization of the polymerizable compound, of providing electrically conductive polymers, including those listed in the above mentioned patents 4,604,427 to Roberts, et al., 4,521,450 to Bjorklund, et al. and 4,617,228 to Newman, et al.

Specifically, suitable chemical oxidants include, for instance, compounds of polyvalent metal ions, such as, for example, $FeCl_3$, $Fe_2(SO_4)_3$, $K_3(Fe(CN)_6)$, $H_3PO_4.12MoO_3$, $H_3PO_4.12WO_3$, $CrO_3$, $(NH_4)_2Ce(NO_3)_6$, $CuCl_2$, $AgNO_3$, etc., especially $FeCl_3$, and compounds not containing polyvalent metal compounds, such as nitrites, quinones, peroxides, peracids, persulfates, perborates, permanganates, perchlorates, chromates, and the like. Examples of such non-metallic type of oxidants include, for example, $HNO_3$, 1,4-benzoquinone, tetrachloro-1, 4-benzoquinone, hydrogen peroxide, peroxyacetic acid, peroxybenzoic acid, 3-chloroperoxybenzoic acid, ammonium persulfate, ammonium perborate, etc. The alkali metal salts, such as sodium, potassium or lithium salts of these compounds, can also be used.

In the case of pyrrole, a great number of oxidants may be suitable for the production of conductive fabrics; this is not necessarily the case for aniline. Aniline is known to polymerize to form at least five different forms of polyaniline, most of which are not conductive. At the present time the emeraldine form of polyaniline as described by Wu-Song Huang, et al., is the preferred species of polyaniline. As the name implies, the color of this species of polyaniline is green in contrast to the black color of polypyrrole. With regard to aniline the concentration in the aqueous solution may be from about 0.02 to 10 grams per liter. Aniline compounds that may be employed include in addition to aniline per se, various substituted anilines such as halogen substituted, e.g. chloro-or bromo-substituted, as well as alkyl or aryl-substituted anilines.

The suitable chemical oxidants for the polymerization include persulfates, particular ammonium persulfate, but conductive textiles could also be obtained with ferric chloride. Other oxidants form polyaniline films on the surface of the fibers such as, for instance, potassium dichromate and others.

When employing one of these non-metallic chemical oxidants for promoting the polymerization of the polymerizable compound, it is also preferred to include a "doping" agent or counter ion since it is only the doped polymer film that is conductive. For these polymers, anionic counter ions, such as iodine, chloride and perchlorate, provided by, for example, $I_2$, HCl, $HClO_4$, and their salts and so on, can be used. Other suitable anionic counter ions include, for example, sulfate, bisulfate, sulfonate, sulfonic acid, fluoroborate, $PF_6$-, $AsF_6$-, and $SbF_6$- and can be derived from the free acids, or soluble salts of such acids, including inorganic and organic acids and salts thereof. Furthermore, as is well known, certain oxidants, such as ferric chloride, ferric perchlorate, cupric fluoroborate, and others, can provide the oxidant function and also supply the anionic counter ion. However, if the oxidizing agent is itself an anionic counter ion it may be desirable to use one or more other doping agents in conjunction with the oxidizing agent.

In accordance with one specific aspect of this invention it has been discovered that especially good conductivity can be achieved using sulfonic acid derivatives as the counter ion dopant for the polymers. For example, mention can be made of the aliphatic and aromatic sulfonic acids, substituted aromatic and aliphatic sulfonic acids as well as polymeric sulfonic acids such as poly (vinylsulfonic acid) or poly (styrenesulfonic acid). The aromatic sulfonic acids, such as, for example, benzenesulfonic acid, para-toluenesulfonic acid p-chlorobenzenesulfonic acid and naphthalenedisulfonic acid, are preferred. When these sulfonic acid compounds are used in conjunction with, for example, hydrogen peroxide, or one of the other non-metallic chemical oxidants, in addition to high conductivity of the resulting polymer films, there is a further advantage that the reaction can be carried out in conventional stainless steel vessels. In contrast, $FeCl_3$ oxidant is highly corrosive to stainless steel and requires glass or other expensive specialty metal vessels or lined vessels. Moreover, the peroxides, persulfates, etc. have higher oxidizing potential than $FeCl_3$ and can increase the rate of polymerization of the compound.

Generally, the amount of oxidant is a controlling factor in the polymerization rate and the total amount of oxidant should be at least equimolar to the amount of the monomer. However, it may be useful to use a higher or lower amount of the chemical oxidant to control the rate of polymerization or to assure effective utilization of the polymerizable monomer. On the other hand, where the chemical oxidant also provides the counter ion dopant, such as in the case with $FeCl_3$, the amount of oxidant may be substantially greater, for example, a molar ratio of oxidant to polymerizable compound of from about 4:1 to about 1:1, preferably 3:1 to 2:1.

Within the amounts of polymerizable compound and oxidizing agent as described above, the conductive polymer is formed on the fabric in amounts corresponding to about 0.5% to about 4%, preferably about 1.0% to about 3%, especially preferably about 1.5% to about 2.5%, such as about 2%, by weight based on the weight of the fabric. Thus, for example, for a fabric weighing 100 grams a polymer film of about 2 gm may typically be formed on the fabric.

Furthermore, the rate of polymerization of the polymerizable compound can be controlled by variations of the pH of the aqueous reaction mixture. While solutions of ferric chloride are inherently acidic, increased acidity can be conveniently provided by acids such as HCl or $H_2SO_4$; or acidity can be provided by the doping agent or counter ion, such as benzenesulfonic acid and its derivatives and the like. It has been found that pH conditions from about five to about one provide sufficient acidity to allow the in status nascendi epitaxial adsorption of the polymerizable compound to proceed. Preferred conditions, however, are encountered at a pH of from about three to about one.

Another important factor in controlling the rate of polymerization (and hence formation of the pre-polymer adsorbed species) is the reaction temperature. As is generally the case with chemical reactions, the polymerization rate will increase with increasing temperature and will decrease with decreasing temperature. For practical reasons it is convenient to operate at or near ambient temperature, such as from about 10° C. to 30° C., preferably from about 18° C. to 25° C. At temperatures higher than about 30° C., for instance at about 40° C. or higher, the polymerization rate becomes too high and exceeds the rate of epitaxial deposition of the in status nascendi forming polymer and also results in production of unwanted oxidation by-products. At temperatures below about 10° C., the polymerization rate becomes slower but a higher degree of order and therefore better conductivities can be obtained The polymerization of the polymerizable compound can be performed at temperatures as low as about 0° C. the freezing temperature of the aqueous reaction media) or even lower where freezing point depressants, such as various electrolytes, including the metallic compound oxidants and doping agents, are present in the reaction system. The polymerization reaction must, of course, take place at a temperature above the freezing point of the aqueous reaction medium so that the prepolymer species can be epitaxially deposited onto the textile material from the aqueous reaction medium.

Yet another controllable factor which has significance with regard to the process of the present invention is the rate of deposition of the in status nascendi forming polymer on the textile material. The rate of deposition of the polymer to the textile fabric should be such that the in status nascendi forming polymer is taken out of solution and deposited onto the textile fabric as quickly as it is formed. If, in this regard, the polymer or pre-polymer species is allowed to remain in solution too long, its molecular weight may become so high that it may not be efficiently deposited but, instead, will form a black powder which will precipitate to the bottom of the reaction medium.

The rate of epitaxial deposition onto the textile fabric depends, inter alia, upon the concentration of the species being deposited and also depends to some degree on the physical and other surface characteristics of the textile material being treated. The rate of deposition, furthermore, does not necessarily increase as concentrations of the polymeric or pre-polymer material in the solution increase On the contrary, the rate of epitaxial deposition of the in status nascendi forming polymer material to a solid substrate in a liquid may actually increase as concentration of the material increases to a maximum and then as the concentration of the material increases further the rate of epitaxial deposition may actually decrease as the interaction of the material with itself to make higher molecular weight materials becomes the controlling factor. Deposition rates and polymerization rates may be influenced by still other factors. For instance, the presence of surface active agents or other monomeric or polymeric materials in the reaction medium may interfere with and/or slow down the polymerization rate. It has been observed, for example, that the presence of even small quantities of nonionic and cationic surface active agents almost completely inhibit formation on the textile material of the electrically conductive polymer whereas anionic surfactants, in small quantities, do not interfere with film formation or may even promote formation of the electrically conductive polymer film. With regard to deposition rate, the addition of electrolytes, such as sodium chloride, calcium chloride, etc. may enhance the rate of deposition.

The deposition rate also depends on the driving force of the difference between the concentration of the adsorbed species on the surface of the textile material and the concentration of the species in the liquid phase exposed to the textile material. This difference in concentration and the deposition rate also depend on such factors as the available surface area of the textile material exposed to the liquid phase and the rate of replenishment of the in status nascendi forming polymer in the vicinity of the surfaces of the textile material available for deposition.

Therefore, it follows that best results in forming uniform coherent conductive polymer films on the textile material are achieved by continuously agitating the reaction system in which the textile material is in contact during the entire polymerization reaction. Such agitation can be provided by simply shaking or vibrating or tumbling the reaction vessel in which the textile material is immersed in the liquid reactant system or alternatively, the liquid reactant system can be caused to flow through and/or across the textile material.

As an example of this later mode of operation, it is feasible to force the liquid reaction system over and through a spool or bobbin of wound textile filaments, fibers (e.g. spun fibers), yarn or fabrics, the degree of force applied to the liquid being dependent on the winding density, a more tightly wound and thicker product requiring a greater force to penetrate through the textile and uniformly contact the entire surface of all of the fibers or filaments or yarn. Conversely, for a loosely wound or thinner yarn or filament package, correspondingly less force need be applied to the liquid to cause uniform contact and deposition. In either case, the liquid can be recirculated to the textile material as is customary in many types of textile treating processes. Yarn packages up to 10 inches in diameter have been treated by the process of this invention to provide uniform, coherent, smooth polymer films. The observation that no particulate matter is present in the coated conductive yarn package provides further evidence that it is not the polymer particles, per se—which are water-insoluble and which, if present, would be filtered out of the liquid by the yarn package—that are being deposited onto the textile material.

As an indication that the polymerization parameters, such as reactant concentrations, temperature, and so on, are being properly maintained, such that the rate of epitaxial deposition of the in status nascendi forming polymer is sufficiently high that polymer does not accumulate in the aqueous liquid phase, the liquid phase should remain clear or at least substantially free of particles visible to the naked eye throughout the polymerization reaction.

One particular advantage of the process of this invention is the effective utilization of the polymerizable monomer. Yields of pyrrole polymer, for instance, based on pyrrole monomer, of greater than 50%, especially greater than 75%, can be achieved.

When the process of this invention is applied to textile fibers, filaments or yarns directly, whether by the above-described method for treating a wound product, or by simply passing the textile material through a bath of the liquid reactant system until a coherent uniform conductive polymer film is formed, or by any other suitable technique, the resulting composite electrically conductive fibers, filaments, yarns, etc. remain highly flexible and can be subjected to any of the conventional knitting, weaving or similar techniques for forming fabric materials of any desired shape or configuration, without impairing the electrical conductivity.

Furthermore, another advantage of the present invention is that the rate of oxidative polymerization can be effectively controlled to a sufficiently low rate to obtain desirably ordered polymer films of high molecular weight to achieve increased stability, for instance against oxidative degradation in air. Thus, as described above, reaction rates can be lowered by lowering the reaction temperature, by lowering reactant concentrations (e.g. using less polymerizable compound, or more liquid, or more fabric), by using different oxidizing agents, by increasing the pH, or by incorporating additives in the reaction system.

While the precise identity of the adsorbing species has not been identified with any specificity, certain theories or mechanisms have been advanced although the invention is not to be considered to be limited to such theories or proposed mechanisms. It has thus been suggested that in the chemical or electrochemical polymerization, the monomer goes through a cationic, free radical ion stage and it is possible that this species is the species which is adsorbed to the surface of the textile fabric. Alternatively, it may be possible that oligomers or pre-polymers of the monomers are the species which are deposited onto the surface of the textile fabric. In the case of the oxidative polymerization of aniline a similar mechanism to the polymerization of pyrrole may occur. It is believed that in the case of polyaniline formation, a free radical ion is also formed as a prepolymer and may be the species which is actually adsorbed.

In any event, if the rate of deposition is controlled as described above, it can be seen by microscopic investigation that a uniform and coherent film of polymer is deposited onto the surface of the textile material Analyzing this film, by dissolving the fibers of the textile fabric from under the composite, washing the residual polymer with additional solvent and then examining the resulting array with a light microscope, shows that the film is actually in the form of burst tubes, thus evidencing the uniformity of the formed electrically conductive film. Surprisingly, each film or fragment of film is quite uniform in these photomicrographs, as best seen from FIGS. 1-A, 1-B, 4-A, 4-B, 5-A and 5-B. The films are either transparent or semi-transparent because the films are, in general, quite thin and one can directly conclude from the intensity of the color observed under the microscope the relative thickness of the film. In this regard, it has been calculated that film thickness may range from about 0.05 to about 2 microns, preferably from 0.1 to about 1 micron. Further, microscopic examination of the films show that the surface of the films is quite smooth, as best seen in FIGS. 2-A, 2-B, 3 and 6. This is quite surprising when one contrasts these films to polypyrrole formed electrochemically or by the prior art chemical methods, wherein, typically, discrete particles may be found within or among the polymeric films.

A wide variety of textile materials may be employed in the method of the present invention, for example, fibers, filaments, yarns and various fabrics made therefrom. Such fabrics may be woven or knitted fabrics and are preferably based on synthetic fibers, filaments or yarns. In addition, even non-woven structures, such as felts or similar materials, may be employed. Preferably, the polymer should be epitaxially deposited onto the entire surface of the textile. This result may be achieved, for instance, by the use of a relatively loosely woven or knitted fabric but, by contrast, may be relatively difficult to achieve if, for instance, a highly twisted thick yarn were to be used in the fabrication of the textile fabric. The penetration of the reaction medium through the entire textile material is, furthermore, enhanced if, for instance, the fibers used in the process are texturized textile fibers.

Fabrics prepared from spun fiber yarns as well as continuous filament yarns may be employed. In order to obtain optimum conductivity of a textile fabric, however, it may be desirable to use continuous filament yarns so that a film structure suitable for the conducting of electricity runs virtually continuously over the entire surface of the fabric. In this regard, it has been observed, as would be expected, that fabrics produced from spun fibers processed according to the present invention typically show somewhat less conductivity than fabrics produced from continuous filament yarns.

A wide variety of synthetic fibers may be used to make the textile fabrics of the present invention. Thus, for instance, fabric made from synthetic yarn, such as polyester, nylon and acrylic yarns, may be conveniently employed. Blends of synthetic and natural fibers may also be used, for example, blends with cotton, wool and other natural fibers may be employed. The preferred fibers are polyester, e.g. polyethylene terephthalate including cationic dyeable polyester and polyamides, e.g. nylon, such as Nylon 6, Nylon 6,6, and so on. Another category of preferred fibers are the high modulus fibers such as aromatic polyester, aromatic polyamide and polybenzimidazole. Still another category of fibers that may be advantageously employed include high modulus inorganic fibers such as glass and ceramic fibers. Although it has not been clearly established, it is believed that the sulfonate groups or amide groups present on these polymers may function as a "built-in" doping agent.

Conductivity measurements have been made on the fabrics which have been prepared according to the method of the present invention. Standard test methods are available in the textile industry and, in particular, AATCC test method 76-1982 is available and has been used for the purpose of measuring the resistivity of textile fabrics. According to this method, two parallel electrodes 2 inches long are contacted with the fabric and placed 1 inch apart. Resistivity may then be measured with a standard ohm meter capable of measuring values between 1 and 20 million ohms. Measurements must then be multiplied by 2 in order to obtain resistivity in ohms on a per square basis. While conditioning of the samples may ordinarily be required to specific relative humidity levels, it has been found that conditioning of the samples made according to the present invention is not necessary since conductivity measurements do not vary significantly at different humidity levels. The measurements reported in the following example are, however, conducted in a room which is set to a temperature of 70° F. and 50% relative humidity. Resistivity measurements are reported herein and in the examples in ohms per square (Ω/sq) and under these conditions the corresponding conductivity is one divided by resistivity.

In general, fabrics treated according to the method of the present invention show resistivities of below $10^6$ ohms per square, such as in the range of from about 50 to 500,000 ohms per square, preferably from about 500 to 5,000 ohms per square. These sheet resistivities can be converted to volume resistivities by taking into consideration the weight and thickness of the polymer films. Some samples tested after aging for several months do not significantly change with regard to resistivity during that period of time. In addition, samples heated in an oven to 380° F. for about one minute also show no significant loss of conductivity under these conditions. These results indicate that the stability of the conductive film made according to the process of the present invention on the surface of textile materials is excellent, indicating a higher molecular weight and a higher degree of order than usually obtained by the chemical oxidation of these monomers.

BRIEF DESCRIPTION OF THE DRAWINGS

In the drawings,

FIG. 1-B is similar to FIG. 1-A but at a magnification of 430×;

FIG. 2-B is similar to FIG. 2-A but at a magnification of 2,000×;

FIG. 4-B is similar to FIG. 4-A but at a magnification of 210×;

FIG. 4-C is similar to FIG. 4-A but at a magnification of 430×;

FIG. 5-B is similar to FIG. 5-A, but at a magnification of 430×;

Figure 1A:
FIG. 1-A is a photomicrograph, magnification 210×, taken by a light microscope, of the polypyrrole film, remaining after dissolution of the basic dyeable polyester fiber, produced in Example 2.

Various procedures can be used to perform the method of preparation of a conductive fabric as it applies to the invention by operating within the parameters as described above. Typical methods are described below:

METHOD A

Approximately 50 g of fabric is placed in a dyeing machine having a rotating basket insert and the port of the machine is closed. Depending upon the desirable liquid ratio, usually about 500 cc, water is then added to the reaction chamber. The basket is turned to assure that the fabric is properly wetted out before any other ingredients are added. Then the desired amount and type of oxidizing agent is dissolved in approximately 500 cc of water and is added to the machine while the basket is rotating. Finally, the monomer and if necessary the doping agent in approximately 500 cc of water is added through the addition tank to the rotating mixture. In order to eliminate any heat build-up during the rotation, cooling water is turned on so that the temperature of the bath is kept at the temperature of the cooling water, usually between 20° and 30° C. After the fabric has been exposed for the appropriate length of time, the bath is dropped and replaced with water; in this way the fabric is rinsed twice. The fabric is then withdrawn and air dried.

METHOD B

An 8 ounce jar is charged with five to ten grams of the fabric to be treated. Generally, approximately 150 cc of total liquor are used in the following manner: First, approximately 50 cc of water is added to the jar and the jar is closed and the fabric is properly wetted out with the initial water charge. The oxidizing agent is then added in approximately 50 cc of water, the jar is closed and shaken again to obtain an appropriate mixture. Then the monomer and if necessary the doping agent in 50 cc of water is added at once to the jar. The jar is first shaken by hand for a short period of time and then is put in a rotating clamp and rotated at approximately 60 RPM for the appropriate length of time. The fabric is withdrawn, rinsed and air dried as described for Method A. Conveniently this method can be used to conduct the reaction at room temperature or if preferred at lower temperatures. If lower temperatures are used the mixture including the fabric and oxidizing agent is first immersed into a constant temperature bath such as a mixture of ice and water and rotated in such a bath until the temperature of the mixture has assumed the temperature of the bath. Concurrently the monomer and if necessary the doping agent in water is also precooled to the temperature at which the experiment is to be conducted. The two mixtures are then combined and the experiment is continued, rotating the reaction mixture in the constant temperature bath.

METHOD C

A one-half gallon jar is charged with 50–100 g of fabric to which usually a total of 1.5 liter of reaction mixture is added in the following manner: First, 500 cc of water are added to the jar and the fabric is properly wetted out by shaking. Then the oxidizing agent dissolved in approximately 500 cc of water is added and mixed with the original charge of water. Subsequently, the monomer and if necessary the doping agent in 500 cc of water is added at once to the jar. The jar is closed and set in a shaking machine for the appropriate length of time. The fabric is withdrawn from the jar and washed with water and air dried.

METHOD D

A glass tube approximately 3 cm in diameter and 25 cm long equipped with a removable top and bottom connection is charged with approximately 5 to 10 g of fabric which has been carefully rolled up to fill approximately 20 cm of the length of the tube. A mixture containing approximately 150 cc of reaction mixture is prepared by dissolving the oxidizing agent in approximately 100 cc of water and then adding at once to the solution a mixture of the monomer and if necessary the doping agent in approximately 50 cc of water. The resulting mixture of oxidizing agent and monomer is pumped into the glass tube through the bottom inlet by the use of a peristaltic pump, e.g. from Cole Palmer. As soon as the entire amount is inside the glass tube, the pump is momentarily stopped and the hose through which the liquor has been sucked out of the container is connected to the top outlet of the reaction chamber. The flow is then reversed and the pumping action continues for the desired amount of time. After this, the tube is emptied and the fabric is withdrawn from the tube and rinsed in tap water.

In Method D the glass tube can be jacketed and the reaction can be run at temperatures which can be varied according to the temperature of the circulating mixture in the jacket.

These methods describe a number of possible modes by which this reaction can be carried out but does not limit the invention to the use of these particular methods.

The invention may be further understood by reference to the following examples but the invention is not to be construed as being limited thereby. Unless otherwise indicated, all parts and percentages are by weight.

EXAMPLE 1

Following the procedure described for Method A, 50 grams of a polyester fabric consisting of a 2×2 right hand twill, weighing approximately 6.6 oz. per square yard and being constructed from a 2/150/34 textured polyester yarn from Celanese Type 667 (fabric construction is such that approximately 70 ends are in the warp direction and 55 picks are in the fill direction), is placed in a Werner Mathis JF dyeing machine using 16.7 g ferric chloride hexahydrate, 2 g of pyrrole, 1.5 g of 37% hydrochloric acid in a total of 1.5 liters of water. The treatment is conducted at room temperature conditions for two hours. The resulting fabric has a dark gray, metallic color and a resistivity of 3,000 and 4,000 ohms per square in the warp and fill directions, respectively.

EXAMPLE 2

Example 1 is repeated except that the fabric is made from basic dyeable polyester made from DuPont's Dacron 92T is used in the same construction as described in Example 1. The resistivity on the fabric measures 2,000 ohms per square in the warp direction and 2,700 ohms per square in the fill direction. This example demonstrates that the presence of anionic sulfonic acid groups, as they are present in the basic dyeable polyester fabric, apparently enhances the adsorption of the polymerizing species to the fabric, resulting in a higher conductivity.

Figure 1B:

The uniformity of the polypyrrole film can be seen from the photomicrographs in FIGS. 1-A and 1-B. These photomicrographs are obtained by cutting the treated fabric into short lengths of about 1 millimeter and collecting a few milligrams of individual coated fibers. The fiber samples are placed into a beaker with a solvent for the fiber, in this case m-cresol at about 130° C. After the fibers are dissolved the remaining black material is placed on a microscopic slide and covered with a glass for examination. In these photographs, the darker shaded areas correspond to overlapping thicknesses of the polypyrrole film.

EXAMPLE 3

Example 1 is repeated except that 50 g of nylon fabric, constructed from an untextured continuous filament of Nylon 6 is used. The black appearing fabric showed a resistivity of 7,000 and 12,000 ohms per square in the warp and fill direction, respectively.

EXAMPLE 4

Seven grams of textured Nylon 6,6 fabric is treated according to the procedure of Method B using a total of 150 cc of liquor, using 1 g of ferric chloride anhydride, 0.15 g of concentrated hydrochloric acid and 0.2 g of pyrrole. After spinning the flask for two hours, a uniformly treated fabric is obtained showing a resistivity of 1,500 and 2,000 ohms per square in the two directions of the fabric.

EXAMPLE 5

Fifty grams of a bleached, mercerized cotton fabric is treated according to Method A using 10 g of ferric chloride anhydride, 1.5 g of concentrated hydrochloric acid, and 2 g of pyrrole. A uniformly treated fabric of dark black color is obtained with resistivities of 71,000 ohms and 86,000 ohms per square, respectively, in the two directions of fabric.

EXAMPLE 6

Fifty grams of a spun Orlon sweater knit fabric is treated according to

Method C, using 10 g of ferric chloride anhydride, 1.5 g of concentrated hydrochloric acid and 2 g of pyrrole. After two hours of shaking, the fabric is withdrawn, washed and dried and shows a resistivity of 7,000 and 86,000 ohms per square in the two directions of the fabric.

EXAMPLE 7

Approximately 50 g of a wool flannel fabric is treated according to Method C using the same chemicals in the same amounts as described in Example 6. After washing and drying, the so prepared wool fabric shows a uniform black color and has a resistivity of 22,000 and 18,000 ohms per square in the two directions of the fabric.

EXAMPLE 8

Approximately 50 g of a fabric produced from a spun viscose yarn, Style #266, from Test Fabrics, Inc. was treated by Method C in the same manner as described in Example 6. After drying, the fabric shows a uniform black color and has a resistivity of 130,000 and 82,000 ohms per square in the two directions of the fabric.

EXAMPLE 9

Figure 2A:
FIG. 2-A is a photomicrograph, magnification 500×, taken with an electron scanning microscope (ESM) of the coated fibers of the nylon 6,6 fabric of Example 9.
Figure 2B:
Figure 3:
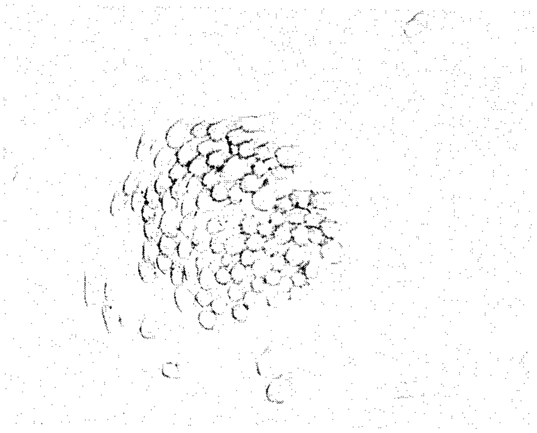
FIG. 3 is a photomicrograph, magnification 210×, taken by light microscope of a cross-section of the spun nylon fibers produced in Example 9.
Figure 4A:
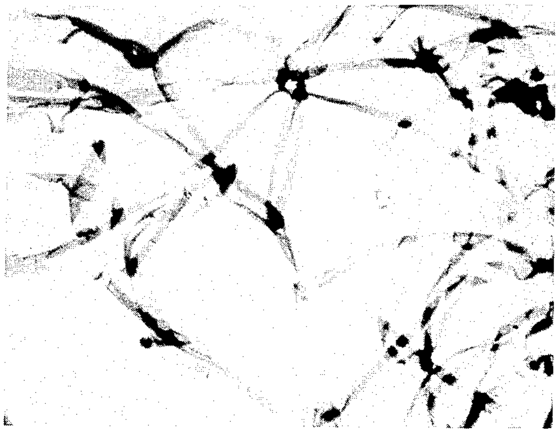
FIG. 4-A is a photomicrograph, magnification 70×, taken by light microscope, showing the polypyrrole film, remaining after dissolution of the nylon 6,6 fibers.
Figure 4B:
Figure 4C:
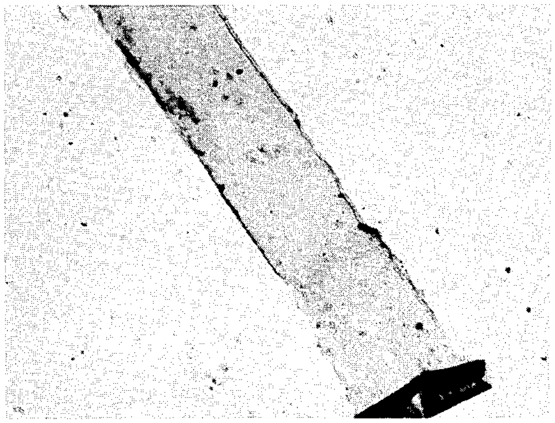

Approximately 50 g of a fabric produced from a spun Nylon 6,6 yarn was treated according to Method A, using the same chemicals and amounts as described in Example 6. After reacting the fabric for two hours and washing and drying, the spun nylon fabric shows a uniform black color and has a resistivity of 2,400 and 6,000 ohms per square, respectively, in the two directions of the fabric. The absence of any surface deposits is seen from FIGS. 2-A and 2-B, showing the coated nylon fibers at 500× and 2,000× magnifications, respectively. The uniformity of the polypyrrole film can be seen from the photomicrograph of the cross-section of the fibers of a single yarn at 210×. FIGS. 4-A, 4-B and 4-C show similarly produced polypyrrole films on nylon fabric, at magnifications of 70×, 210× and 430×, respectively, after dissolution of the nylon fibers (as described in Example 2) using concentrated formic acid at room temperature as the solvent for Nylon 6,6.

EXAMPLE 10

Fifty grams of a fabric produced from a spun polypropylene yarn is treated according to Method A, using the same chemicals and amounts as described in Example 6. After treatment and drying, the so produced polypropylene fabric has a metallic gray color and shows a resistivity of 35,000 and 65,000 ohms per square, respectively, in the two directions of the fabric.

EXAMPLE 11

Approximately 50 g of a fabric produced from a spun polyester yarn is treated according to Method A, using identical chemicals and amounts as described in Example 1. After drying, a uniformly appearing grayish fabric is obtained showing a resistivity of 11,000 and 20,000 ohms per square in the two directions of the fabric.

EXAMPLE 12

Approximately 5 g of an untextured Dacron taffeta fabric is treated according to Method B, as described in Example 4. After treatment, a uniformly grayish looking fabric having resistivity of 920 and 960 ohms per square in the two directions of the fabric is obtained.

EXAMPLE 13

Approximately 5 g of a weft insertion fabric, consisting of a Kevlar warp and a polyester filling, is treated according to Method B, using the same conditions as described in Example 4. The resulting fabric has a resistivity of approximately 1,000 ohms per square in the direction of the Kevlar yarns and 3,500 ohms per square in the direction of the polyester yarns.

EXAMPLE 14

Approximately 5 g of a filament acetate sand crepe fabric is treated according to Method B, under the same conditions as described in Example 4. The resulting fabric has a resistivity of approximately 7,200 and 9,200 ohms per square in the two directions of the fabric.

EXAMPLE 15

Approximately 5 g of a filament acetate Taffeta fabric is treated according to Method B, using the same conditions as described in Example 4. The resulting fabric has a resistivity of approximately 47,000 and 17,000 ohms per square in the two directions of the fabric.

EXAMPLE 16

Approximately 5 g of a filament Rayon Taffeta fabric is treated according to Method B, using the same conditions as described in Example 4. The resulting fabric has a resistivity of approximately 420,000 and 215,000 ohms per square in the two directions of fabric.

EXAMPLE 17

Approximately 5 g of a filament Arnel fabric is treated according to Method B, using the same conditions as described in Example 4. The resulting fabric has a resistivity of approximately 6,000 and 10,500 ohms per square in the two directions of the fabric.

The previous examples show the applicability of the process of this invention to a wide range of synthetic and natural fabrics under a broad range of conditions, including reactant concentrations and contacting methods. The following examples serve to further demonstrate some of the useful parameters for carrying out the present invention.

EXAMPLE 18

This example demonstrates the influence of various types of surface active agents in the process of this invention.

The procedures described for Example 1 are repeated except that an anionic, nonionic or cationic surfactant of the type and in the amount shown in the following Table 1 is used. The results of the resistivity measurements are also shown in Table 1.

From the results reported in Table 1 it is seen that the incorporation of the anionic surfactant promotes the formation of the electrically conductive polypyrrole film, whereas the incorporation of the nonionic or cationic surfactant inhibits formation of conductive polypyrrole.

When the procedure of Runs B-D is repeated, using N-methylpyrrole in place of pyrrole, similar results are obtained.

When Run B is repeated but using 4 grams of sodium octyl sulfate the resistivity is increased to more than $40\times10^6$ ohms. In other words, high amounts of anionic surfactant, for example, from about 2–5 or more grams per liter, interfere with the deposition/polymerization reaction in the same way as the use of cationic or non-ionic surfactants.

Although the precise mechanism by which the surfactant interferes with the deposition of a conductive polymer film is not completely understood, it is presumed that the surfactant competes with the in status nascendi forming polymer species for available deposition sites on the textile substrate.

EXAMPLE 19

This example demonstrates the influence of reactant concentration on the conductive polypyrrole films produced according to this invention.

Following the procedure of Method A, using 50 grams of the same polyester fabric as described in Example 1, the reactant concentrations are varied as shown in Table 2. The resistivity of the resulting fabric is measured after the treatment is conducted a room temperature conditions for two hours, followed by rinsing and drying as described in Method A.

Figure 7:
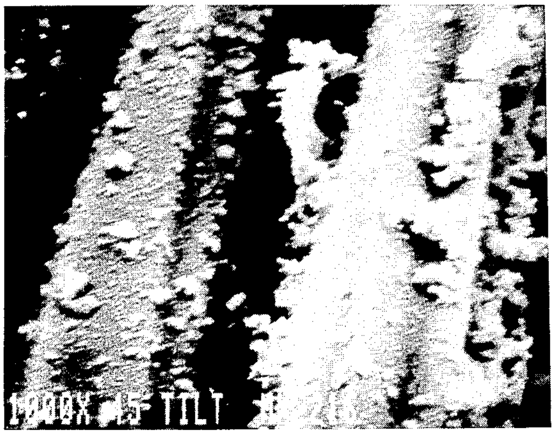
FIG. 7 is a photomicrograph, magnification 1,000×, taken by an ESM, of the coated polyester fibers produced in Example 19, Run G.
Figure 8:
FIG. 8 is a photomicrograph, magnification 210×, taken by light microscope, of the polypyrrole film, remaining after dissolution of the polyester fiber produced in Example 19, Run G.

In Run G, although the quantity of polymer pick-up is as high as about 9% and the resistivity is very low, the appearance of the treated fabric is very non-uniform. Substantial surface deposits on the relatively thick polypyrrole film are seen from FIG. 7, which is a photomicrograph, magnification 1,000×, of individual fibers.

Figure 5A:
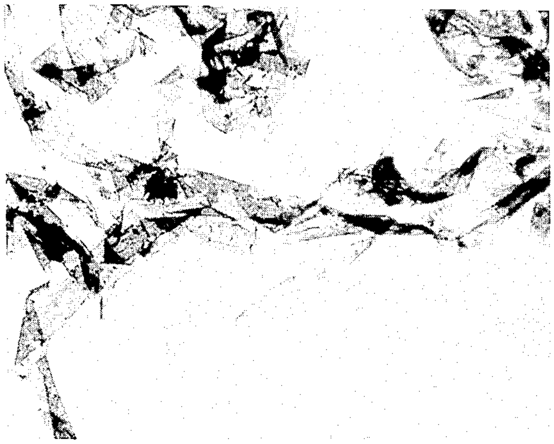
FIG. 5-A is a photomicrograph, magnification 210×, taken by light microscope, of the polypyrrole film, remaining after dissolution of the polyester fiber produced in Example 19, Run B.
Figure 5B:
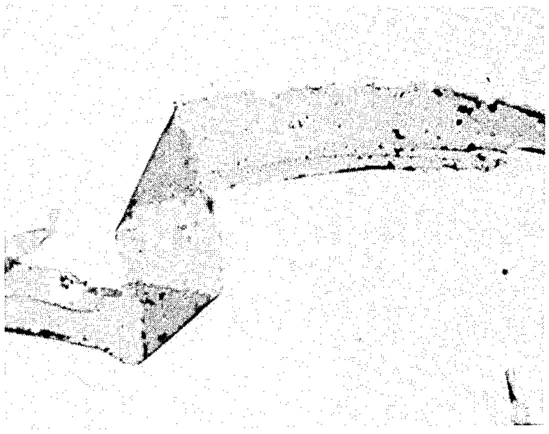
Figure 6:
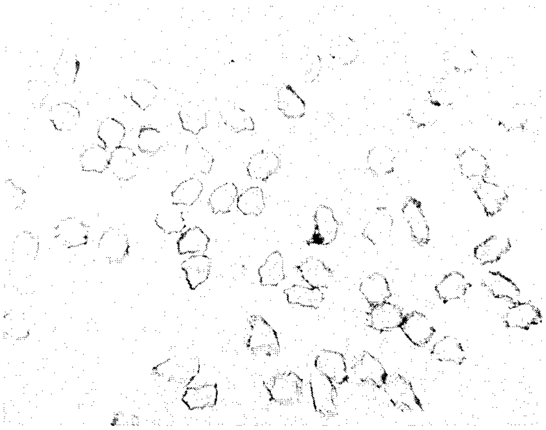
FIG. 6 is a photomicrograph, taken by light microscope, magnification 210×, of the cross-section of the coated polyester fibers from Example 19, Run B.

FIGS. 5-A and 8, each at 210× magnification, show the polypyrrole film, after dissolution of the polyester fibers with m-cresol (at 130° C.), from Run B (10 g $FeCl_3$, 1.5 g HCl, 2 g pyrrole) and Run G (40 g $FeCl_3$, 6 g HCl and 8 g pyrrole), respectively. These photographs reveal the difference between the treatment conditions with respect to the uniformity of the polypyrrole film, and the possibility of avoiding depositing polymer particles by selection of appropriate concentrations of reactants. FIG. 5-B (polypyrrole film at 430×) and FIG. 6 (fiber cross-section at 210×) further illustrate the uniformity of the polypyrrole film coatings which can be obtained by the present invention.

EXAMPLE 20

Following the procedure of Method A, 50 grams of a polyester fabric, as described in Example 1, is treated at room temperature for two hours in a Werner Mathis JF dyeing machine, using 3.75 g of sodium persulfate, 2 g of pyrrole in a total of 1.5 liter water. The resulting fabric has a resistivity of 39,800 and 57,000 ohms per square in the warp and fill directions, respectively.

When this example is repeated, except that 20 g NaCl is used in the treatment, the resistivity values are decreased to 11,600 ohms and 19,800 ohms per square in the warp and fill directions, respectively.

If in place of 20 g NaCl, 10 g $CaCl_2$ is used and the total amount of water is decreased in 1.0 liter, the resistivity is further lowered to 3,200 ohms per square and 4,600 ohms per square, respectively. These results are comparable to the results obtained in Example 1 using 16.7 g $FeCl_3.6H_2O$ and 1.5 g of 37% HCl.

EXAMPLE 21

This example shows that the conductive polypyrrole films are highly substantive to the fabrics treated according to this invention. The procedure of Example 1 is repeated, except that in place of 16.7 g of $FeCl_3.6H_2O$, 10 g of anhydrous $FeCl_3$ is used. The resulting fabric is washed in a home washing machine and the pyrrole polymer film is not removed, as there is no substantial color change after 5 repeated washings.

EXAMPLE 22

This example shows the influence of the treatment time on the conductivity of the deposited pyrrole polymer film.

Following the procedure of Method B, 4 sheets, each weighting 5 g, of the same polyester fabric as used in Example 1 are prepared. Each sheet is treated in 150 cc of water with 1 g anhydrous ferric chloride, 0.15 g HCl and 0.2 g pyrrole. The jar is rotated 15 minutes. 30 minutes, 60 minutes or 120 minutes, to form a conduction polypyrrole film on each of the four sheets after which the fabric is withdrawn from the jar, rinsed and air-dried. The resistivities of the dried fabrics are measured in the warp and fill directions. The resutlts are shown in Table 3.

TABLE 3

Influence on Contact Time

| Contact Time (minutes) | Resistivity (Ω/sq) Warp | Fill |
|---|---|---|
| 15 | 7,800 | 8,600 |
| 30 | 3,000 | 3,800 |
| 60 | 2,400 | 2,800 |
| 120 | 2,000 | 2,400 |

EXAMPLE 23

In order to demonstrate the stability of the conductive polypyrrole composite fabrics of this invention, two different types of polyester fabrics (from Examples 1 and 2, respectively) are treated under the same conditions as used in Examples 1 and 2. The composite fabrics are placed in a preheated oven at 380° F. for 60 seconds. The results are shown in Table 4.

TABLE 4

| Fabric | Resistivity (Ω/sq) Before Treatment | | After Treatment | |
|---|---|---|---|---|
| Celanese Type 667 Textured Polyester | 6,000 | 6,200 | 8,200 | 19,000 |
| Dacron 92T (DuPont) | 5,700 | 8,400 | 7,200 | 10,800 |

EXAMPLE 24

This example demonstrates that the process of this invention does not work with ordinary organic solvents In each case 5 grams of polyester fabric is treated by Method B, using 150 cc of solvent and 1.0 g anhydrous $FeCl_3$, 0.2 g pyrrole and 0.15 g conc. HCl. The following solvents are used: methylene chloride, acetonitrile, nitrobenzene, methanol, ethanol, isopropanol, tetrahydrofuran, ethyl acetate. The treatment is continued at room temperature for 2 hours. None of these solvents provides a polypyrrole film deposited on the polyester fabric. Similar negative results are obtained using N-methyl-pyrrole in place of pyrrole. Similar negative results are also obtained using other oxidizing agents.

EXAMPLE 25

This example is designed to confirm that it is not the polypyrrole polymer, per se, that is being adsorbed by the textile substrate.

A. Following the procedure for Method C except that no fabric is used, 16.7 g $FeCl_3.6H_2O$, 2 g pyrrole, 1.5 g HCl and 1.5 liters $H_2O$ are added to the jar and, with agitation, the reaction proceeds at room temperature for 2 hours. A black powder is formed and is filtered, washed with water and dried. Approximately 300 mg of black powder (polypyrrole) is recovered.

This black powder (300 mg) is then added to the jar containing 1.5 liters $H_2O$, 1.5 g HCl and 50 g of polyester fabric (as described in Example 1 is used) and shaken for 2 hours. The fabric is withdrawn, washed with water and dried. The fabric has a dirty, uneven appearance and no improvement in conductivity. Thus, a conductive film of pyrrole polymer is not deposited on the fabric simply by immersing the fabric in a suspension or dispersion of polypyrrole black powder.

B. When the above procedure is repeated except that the oxidative polymerization reaction is allowed to proceed for 20 hours (rather than 2 hours) approximately 1 g (approximately 50% yield) of black powder is formed. If 50 grams of the polyester fabric is immersed in a suspension of the black powdery polypyrrole (1 g) in 1.5 liters water containing 1.5 g HCl, similar results are obtained, namely a dirty appearing fabric with no readable improvement in resistivity up to $40\times10^6$ ohms, the highest readable value for the meter used to measure resistivity.

C. Example 25A is repeated except that the black powder formed after reaction for 2 hours is not separated and 50 grams of the polyester fabric is inserted into the reaction mixture and shaking is continued for another 2 hours after which the fabric is withdrawn, rinsed and dried. Approximately 1 gram (approximately 2% o.w.f pick-up) of conductive polypyrrole film is deposited on the fabric. All of the remaining liquor is collected, and filtered from the remaining black powder, washed and dried. Approximately 0.24 g of polypyrrole is recovered which is about the same amount as described in Example 25A. Nevertheless, the remaining liquid is capable of producing another gram of polypyrrole on the surface of the fabric after only 2 additional hours.

Therefore, this example shows that the pyrrole is polymerized slowly in the absence of the textile material, but in the presence of the textile material the polymerization proceeds faster and on the surface of the fabric In other words, it appears that the fabric surface functions to catalyze the reaction and to adsorb the in status nascendi forming polymer.

EXAMPLE 26

To show that neither the monomer nor the oxidizing agent is adsorbed or absorbed onto or into the fibers of the textiles the following experiments were conducted:

(1.) 0.8 g of pyrrole was dissolved in 600 cc of water and 150 cc each were dispensed into four 8 oz. jars.

(2.) A solution of 11 g $FeCl_3.6H_2O$ in 1,000 ml of water containing 1 g of concentrated hydrochloric acid was prepared and filtered and 150 g of this solution was added to four 8 oz. jars.

Three 7×7" fabrics were used, (a) polyester (as in Example 1 weighing approx. 5 g), (b) basic dyeable polyester (as in Example 2 weighing approx. 9 g) and (c) textured nylon (as in Example 4 weighing approx. 7 g) and placed into the monomer or oxidant solution respectively. One jar served as reference. All 8 containers were closed and tumbled for 4 hours and the concentration of the reactant was measured at this time.

The concentration of pyrrole was determined by U.V. spectroscopy and ferric chloride was determined by atomic adsorption.

As can be seen from Table 5 no adsorption of either agent is taking place

TABLE 5

Concentration of Pyrrole and Ferric Chloride After 4 Hours Tumbling in the Presence and Absence of Textiles

| | Extinction at λ max. | Fe in PPM |
|---|---|---|
| Control | 2.96 | 2151 |
| Polyester | 2.95 | 2202 |
| Basic Dyeable Polyester | 2.95 | 2194 |
| Nylon | 2.95 | 2062 |

EXAMPLE 27

This example is carried out following the procedure of Example 12 (Method B—polyester fabric 5 g) using 1.7 g $FeCl_3.6H_2O$, 0.2 g pyrrole and 0.5 of various different counter ions (doping agents) in 150 cc of $H_2O$. The resistivities of the resulting composite fabrics are shown in Table 6.

TABLE 6

| Run No. | Doping Agent (0.5 grams) | Resistivity (Ω/sq.) Warp | Fill |
|---|---|---|---|
| A. | Toluenesulfonic acid | 480 | 750 |
| B. | Sodium benzenesulfonic acid | 500 | 1,400 |
| C. | 1,5-naphthalenedisulfonic acid, disodium salt | 360 | 460 |
| D. | Sodium lauryl sulfate (1 gram of a 33% solution) | 12,400 | 20,000 |
| E. | 2,6-naphthalenedisulfonic acid, disodium salt | 300 | 440 |
| F. | Sodium diisopropylnaphthalene sulfonate | 920 | 1,200 |
| G. | Petroleum sulfonate | 2,000 | 2,700 |

Sulfur compounds and their salts are effective doping agents for preparing electrically conductive polypyrrole films on textile materials. Sodium diisopropylnaphthalene sulfonate and petroleum sulfonate, however, form a precipitate with $FeCl_3$ and, therefore, are not preferred in conjunction with iron salts. However, these two anionic surface active compounds as well as sodium lauryl sulfate do appear to accelerate the oxidative polymerization reaction.

EXAMPLE 28

The following example demonstrates the importance of temperature in the epitaxial polymerization of pyrrole. Following the procedure for low temperature reaction given in Method B, 5 grams of polyester fabric as defined in Example 1 was treated using 1.7 gram of ferric chloride hexahydrate, 0.2 grams of pyrrole, 0.5 grams of 2,6-naphthalenedisulfonic acid, disodium salt in 150 cc of water at 0° C. After tumbling the sample for 4 hours the textile material was withdrawn and washed with water. After drying a resistivity of 100 ohms and 140 ohms was obtained in the two directions of the fabric.

EXAMPLE 29

The same experiment was repeated but instead of the polyester fabric, 7 grams of a knitted, textured nylon fabric was used. After rinsing and drying resistivities of 130 and 180 ohms respectively were obtained in the two directions of the fabric.

EXAMPLE 30

Following the procedure given for low temperature experiments under Method B, 5 grams of polyester fabric as defined in Example 1 was treated with 0.7 grams sodium persulfate, 0.2 grams pyrrole and 0.5 grams of 2.6-naphthalenedisulfonic acid, disodium salt in 150 cc of water. After tumbling the mixture for 2 hours at 0° C. the textile material was withdrawn, washed with water and air dried. The fabric showed a resistivity of 150 and 220 ohms in the two directions of the fabric.

EXAMPLE 31

The same example was repeated but 7 grams of a textured nylon fabric was used. The resistivity was determined to be 180 and 250 ohms in the two directions of the fabric. These samples clearly demonstrate the improvements in conductivity which can be obtained by conducting the epitaxial polymerization at lower temperatures. As the polymerization rate is considerably lowered at 0° C., it is now possible to also use higher concentrations of pyrrole or lower liquor ratios which yields even better conductivities.

EXAMPLE 32

This example shows the effect of another oxidant, ammonium persulfate, alone and with various sulfur compound doping agents. The same procedure as used in Example 27 is followed except that 0.375 g ammonium persulfate [$(NH_4)_2S_2O_8$] is used in place of 1.7 g. $FeCl_3.6H_2O$. Table 7 shows the doping agent, and results of the treatment which is carried out for 2 hours at room temperature.

TABLE 7

| Run No. | Doping Agent | Amount (g) | Resistivity ohms/sq | |
|---|---|---|---|---|
| A. | None | — | 9,800 | 12,000 |
| B. | Toluenesulfonic acid | 0.5 | 2,000 | 2,600 |
| C. | 1,5-Naphthalene-disulfonic acid, disodium salt | 0.5 | 800 | 1,000 |
| D. | conc. $H_2SO_4$ | 0.5 | 13,000 | 16,800 |

Sample C was retested for its resistivity after aging under ambient conditions for four months. The measurements obtained were 800 and 1300 ohms in the two directions of the fabric. This illustrates the excellent stability of products obtained by this invention. In contrast, stabilities of composite structures reported by Bjorklund, et al., Journal of Electronic Materials, Vol. 13, No. 1 1984 p. 221, show decreases of conductivity by a factor of 10 or 20 over a 4 month period.

EXAMPLE 33

This example illustrates a modification of the procedure of Method A described above using ammonium persulfate (APS) as the oxidant wherein the total amount of oxidant is introduced incrementally to the reaction system over the course of the reaction.

Fifty two grams of polyester fabric, as described in Example 1, is placed in the rotating basket insert of a Werner Mathis JF dyeing machine and, with the port of the machine closed, 500 cc of water is added to the reaction chamber to wet out the fabric. Then 1.7 g APS and 5 g of 1,5-naphthalenedisulfonic acid, disodium salt, dissolved in 500 cc of water is introduced to the reaction chamber while the basket is rotating. Finally, 2 g pyrrole in 500 cc water is added to the rotating mixture and the reaction is allowed to proceed at about 20° C. for 30 minutes, at which time an additional 1.7 g APS (in 50 cc $H_2O$) is introduced to the rotating reaction mixture. After 60 minutes and 90 minutes from the initiation of the reaction (i.e. from the introduction of the pyrrole monomer) an additional 1.7 g APS in 50 cc water is introduced to the reactor, such that a total of 6.8 g APS (1.7×4) is used. The reaction is halted at the end of two hours (30 minutes after last introduction of APS) by dropping the bath and rinsing twice with water. The fabric is withdrawn from the reactor and is air dried. The pH of the liquid phase at the end of the reaction is 2.5. The resistivity of the fabric is 1,000 ohms per square and 1,200 ohms per square in the warp and fill directions, respectively. Visual observation of the liquid phase at the end of the reaction shows that no polymer particles are present.

EXAMPLE 34

This example demonstrates the influence of the concentration of APS oxidant in the reaction system. The procedure of Method B is followed using 5 g polyester fabric as described in Example 1 with 0.2 g pyrrole, 0.5 g 1,5-naphthalenedisulfonic acid, disodium salt as doping agent and 150 cc of water. APS is used at concentrations of 0.09 g, 0.19 g, 0.375 g and 0.75 g. The results are shown in Table 8.

TABLE 8

| Run No. | APS in g | Resistivity (Ω/sq) Warp | Fill |
|---|---|---|---|
| A. | 0.09 | 15,400 | 31,600 |
| B. | 0.19 | 3,400 | 4,000 |
| C. | 0.375 | 1,480 | 1,880 |
| D. | 0.75 | 1,500 | 1,900 |

In each of Runs A-D the liquid phase remains clear throughout the reaction, confirming that the in status nascendi forming polymer is adsorbed by the textile fabric where polymerization of the conductive polymer is completed, namely that the conductive polymer is not formed in the liquid phase.

EXAMPLE 35

Example 34 is repeated, except that different amounts of ammonium persulfate are used and 2,6-naphthalene disulfonic acid disodium salt was used instead of the 1,5 substituted derivative. The results are shown in Table 9.

TABLE 9

| Run No. | APS in g. | Resistivity (Ω/sq.) Warp | Fill |
|---|---|---|---|
| A | .375 | 1,700 | 2,200 |
| B | .560 | 1,200 | 1,800 |
| C | .750 | 1,500 | 2,200 |

EXAMPLE 36

This example demonstrates that the conductivity of the polypyrrole film can be reversed by sequential neutralization and replacement of the counter ion doping agent.

The composite fabrics prepared in Example 27, Runs A (toluene sulfonic acid) and C (1,5-naphthalenedisulfonic acid, disodium salt) are used. In order to neutralize the sulfonic acid counter ion, each composite fabric sample is individually immersed in 200 cc water solution of ammonia (8 grams) and tumbled for 2 hours. The treated fabric is rinsed with fresh water and then dried. The resistivity of each fabric before the washing treatment, after the washing treatment, and after redoping is measured and the results are shown in Table 10. Redoping is carried out after immersing the ammonia treated fabric in water, and reimmersing the wet fabric in (a) 0.5 g toluene sulfonic acid in 200 cc water or (b) 0.5 g 1,5-naphthalene disulfonic acid, disodium salt, in 200 cc water, plus 3 drops $H_2SO_4$ (conc.) The results are reported in Table 10.

TABLE 10

| | Resistivity, Warp/Fill (Ω/sq) | | | |
|---|---|---|---|---|
| Fabric | Initial | After Neutralization | (a) | (b) |
| Ex. 26-A | 480/750 | 428,000/680,000 | 2,520/3,240 | 1,060/1,360 |
| Ex. 26-C | 360/460 | 173,000/246,800 | 940/1,260 | 480/540 |

As seen from this example it is possible to undope (reduced state) and redope (oxidized state) the polypyrrole film. This ability can be utilized to reversibly alter the conductivity of the composite fabric between highly conductive and weakly conductive or non-conductive states. Furthermore, in view of the extreme thinness of the conductive films, i.e. generally less than 1 micron, e.g. about 0.2 micron, the rates of diffusion of the doping agent into and out of the film are very high. Therefore, the composite fabrics can be used, for example, as a redox electrode in electrochemical cells, fuel cells and batteries.

EXAMPLE 37

This example demonstrates the application of the process of this invention to the production of electrically conductive composite yarn. The process is carried out using conventional package dyeing equipment.

A. 2376 g of a texturized Dacron Polyester yarn, type 54, 1/150/34, is wound on a bobbin and placed in a Gaston County package dyeing machine where it is scoured with water (3 times each with 14 liters of water). The machine is then filled with 12 kg water to which is added consecutively 50 g of 1,5-naphthalenedisulfonic acid, disodium salt in 500 cc water; 25 g pyrrole in 500 cc water and 37.5 g potassium persulfate in 500 cc water. Additional water is then added to fill the machine to capacity. The machine is then run at room temperature for 60 minutes with the direction of flow of liquid through the yarn being changed every 3 minutes, i.e. after each 3 minute cycle, the direction of flow is reversed from inside-out to outside-in or vice versa.

By "outside-in" is meant that the liquid is forced from the outside of the yarn package into the perforated spindle and through a recirculating system back to the outside of the yarn package In the inside-out flow pattern this procedure is reversed.

At the end of 60 minutes the liquid is removed and the yarn is rinsed. The polyester yarn is uniformly coated throughout the yarn package and is electrically conductive.

B. The procedure of Example 34A is repeated using 1112 grams of polyester yarn 1/150//68, Type 54 treated with 167 g $FeCl_3$ in 1000 cc $H_2O$ and 20 g HCl and 25 g pyrrole in 500 cc $H_2O$. After twenty 3 minute cycles (60 minutes in total) an evenly coated conductive yarn is obtained.

EXAMPLE 38

Following the procedure in Method B, 7 g of textured nylon fabric, test fabric style 314 is inserted into an 8 oz. jar containing 150 cc of water, 0.4 g of aniline hydrochloride, 1 g conc. HCl, 1 g of 2,6-naphthalenedisulfonic acid, disodium salt and 0.7 g of ammonium persulfate. After rotating the flask for 2 hours at room temperature a uniformly treated fabric having the typical green color of the emeraldine version of poly-aniline is obtained showing a resistivity of 4200 ohms and 5200 ohms in the two directions of the knitted fabric.

EXAMPLE 39

The above experiment is repeated except that the reaction vessel is immersed in an ice water mixture to conduct the reaction at 0° C. A green colored fabric is obtained showing a resistivity of 6400 ohms and 9000 ohms in the two directions of the fabric.

EXAMPLE 40

Example 38 was repeated using 5 g of polyester fabric as defined in example #1. A resistivity of 75000 and 96600 ohms was measured in the two directions of the fabric.

EXAMPLE 41

The same experiment as in Example 38 was repeated but 9 g of basic dyeable polyester, as defined in example #2, was used. A resistivity of 15800 and 11800 ohms was measured in the two directions of the fabric.

EXAMPLE 42

Following the procedure in Method B, 7 grams of textured nylon fabric is inserted into an 8 ounce jar containing 75 cc of water, 0.4 gram of aniline hydrochloride, 5 grams of concentrated HCl, 1 gram of 1,3-benzenedisulfonic acid disodium salt and 0.7 gram of ammonium persulfate. After rotating the flask for 4 hours at room temperature, a uniformly treated fabric having a green color was obtained, showing a resistivity of 1500 ohms and 2000 ohms in the two directions of the knitted fabric. This example demonstrates how variations in concentration and acidity can lead to improved and higher conductive fabrics.

EXAMPLE 43

Comparative Example

Following the procedure of Example 1 of U.S. Pat. No. 4,521,450 (Bjorklund, et al.) 5 different fabric materials (100% polyethylene terephthalate; 100% cotton; basic dyeable polyester; wool; acrylic knit; nylon taffeta) are treated with a solution of 10 g $FeCl_3.6H_2O$ in 100 ml 0.01 M HCl. Each fabric is dipped in the $FeCl_3$ solution until thoroughly wet-out and is then placed in a container and covered with pyrrole liquid where it remains at room temperature. The samples are then withdrawn and rinsed with water. In each case the fabric is extremely non-uniformly coated with the pyrrole polymer and many thick deposits are observed on all the substrates. Furthermore, the fabrics are stiff, indicating polymerization in the interstices as described in the patent. Polymerization is also observed in the pyrrole liquid and powdery polymer particles precipitate onto the fabric and onto the glass container.

EXAMPLE 44

XPS Spectra Comparison

XPS spectra were run on polypyrrole coated quartz fabrics according to the method described in the present application, the method described in Maus, U.S. Pat. No. 4,696,835, and Bjorklund, U.S. Pat. No. 4,521,450. These fabrics were compared and contrasted in order to determine polymer order on the coated fabric. A sample is also prepared containing no fabric where the pyrrole was solution polymerized using the same concentrations as described in the above-identified application. This polymerized pyrrole is studied in the form of a pressed pellet.

All XPS analyses were performed in the scanning mode on quartz coated fabric so that there would be no contribution from underlying carbons as there would be on typical synthetic fabrics such as polyester and nylon which, of course, contain carbon. The instrumental resolution was 2 eV using a 300u diameter X-ray spot. Twenty eight scans were taken on sample A prepared according to the Kuhn method and 30 scans on sample B prepared according to the Kuhn method, and 50 scans were taken of each carbon 1s peak for the other samples. A 20 eV wide window was used in all cases and approximately centered on each peak. Peak fitting was performed for each carbon 1s peak by constraining the full width half height of the alpha and beta carbons to their literature values (see P. Pfluger and G. B. Street, J. Chem Phys. 80 (1), 544. Gaussian components were used for the deconvolutions The procedure used to prepare the samples made as described above according to the present application is the general procedure set forth in Example 1 above except that the hydrochloric acid was deleted. The aqueous solution consisted of 200 ml of water, 1.7g of $FeCl_3.H_2O$ and 0.2g of pyrrole. The quartz fabric was a 5.5 g Stevens Astro Quartz fabric and the reaction was run at ambient temperature. The samples were washed in distilled water prior to submission for XPS study.

The polypyrrole pellet sample was prepared out of an aqueous solution containing the identical concentration of components.

Figure 9:
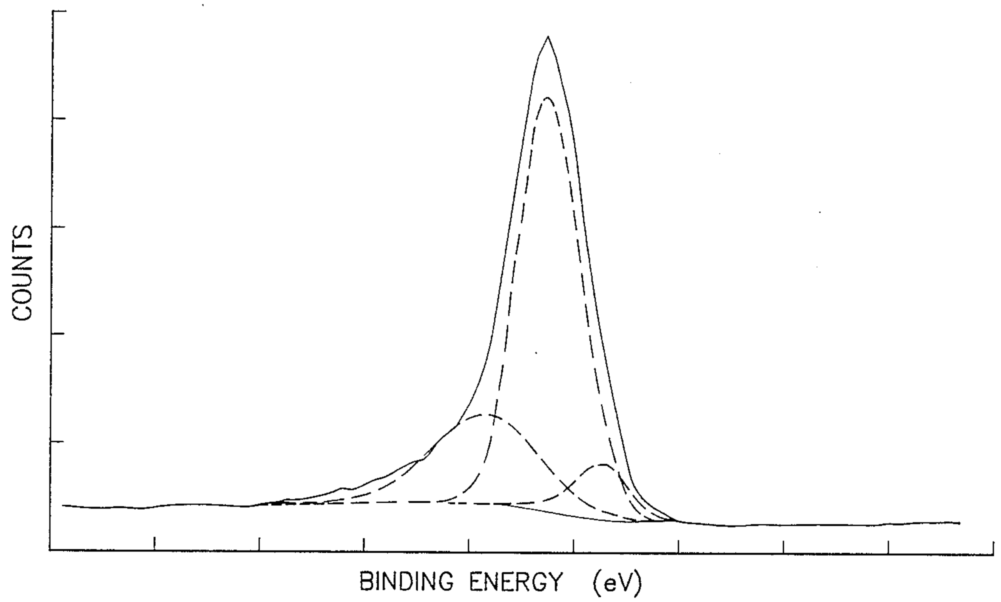
Figure 10:
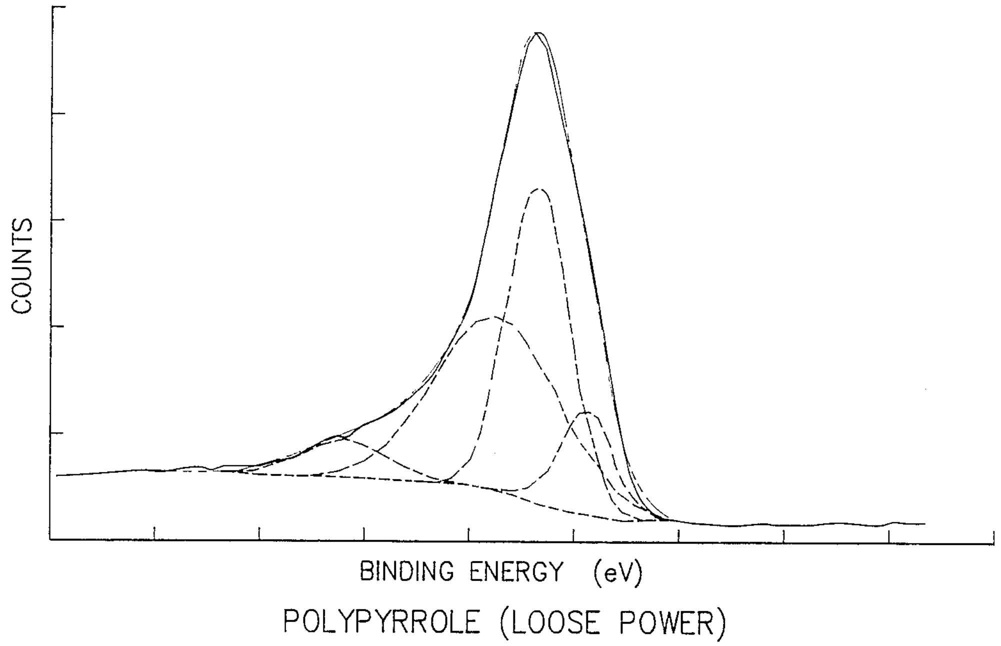

The XPS results are reported in FIGS. 9 and 10 according to accepted methods of spectra interpretation developed by Pfluger and Street (J. Chem. Phys. 80 (1), 544) the difference in polymer order is clearly demonstrated. The spectra of the polypyrrole quartz fabric made according to the present application shows considerably more order than that of the surface absent free formed polypyrrole shown in FIG. 10. This is due to a higher degree of alpha-alpha bonding which is consistent with a higher degree of order. The alpha-alpha bonding peak is the large peak at 284.40 eV with the disorder peaks being at 285.83 eV. This disorder is due it is believed to saturated pyrrole moieties in the chain, alpha-beta coupling, and crosslinking.

Figure 11:
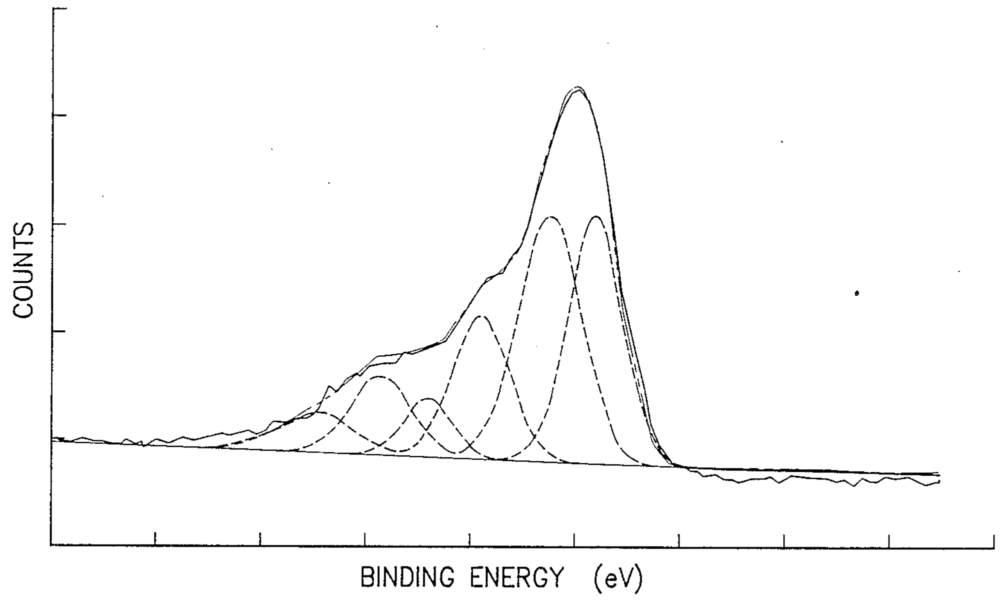
Figure 12:
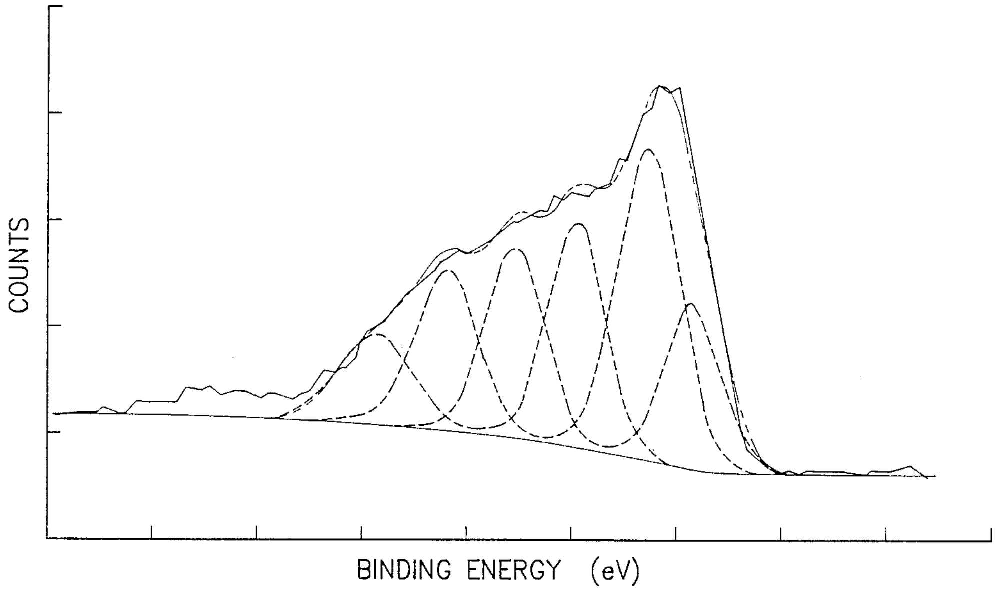

As indicated above a separate sample of quartz fabric was coated with polypyrrole according to the method described by Maus, U.S. Pat. No. 4,696,835. The procedure followed was as follows: a 4×4" piece of quartz fabric (the same sample as used above) was dipped into a solution of 10 g of ferric chloride and 100 ml of acetonitrile. After drying the fabric was suspended 1 inch above the surface of a plate containing pyrrole monomer. Two samples were taken after polymerization had taken place. Sample C was submitted as is for XPS study and sample D was washed in distilled water prior to submission for XPS study. As can be seen in FIGS. 11 and 12, there is substantial asymmetry to the XPS spectral peaks. In both of these figures the deconvoluted alpha-alpha bonding peaks occur at 284.47 eV, the same energy as the Kuhn sample alpha-alpha bonds, but have a considerably less contribution to the general peak shape indicating less polymer order. The growth of additional disorder peaks at higher energies is also indicative of greater disorder in the polymer chain.

Figure 13:
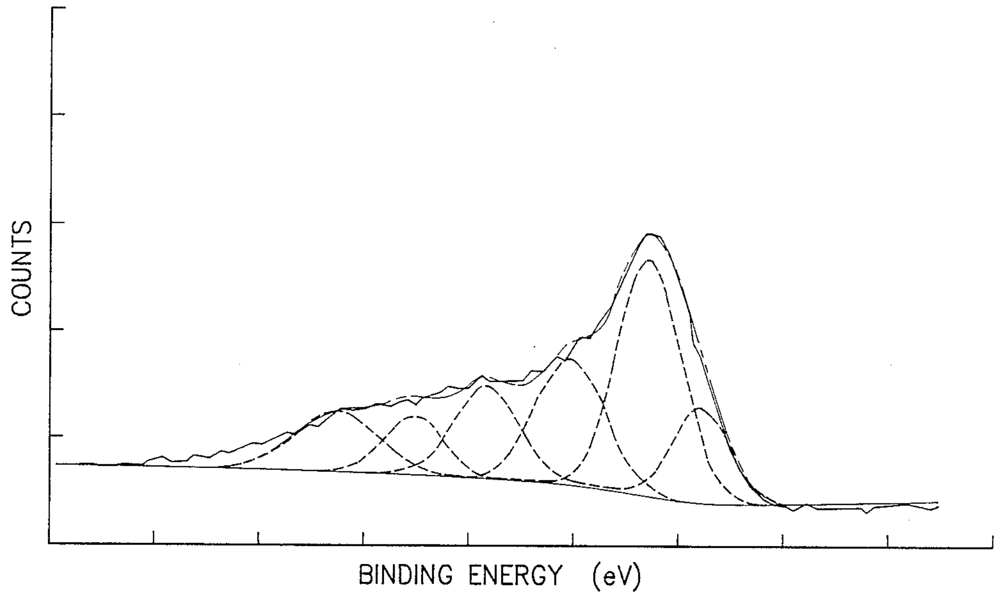
Figure 14:
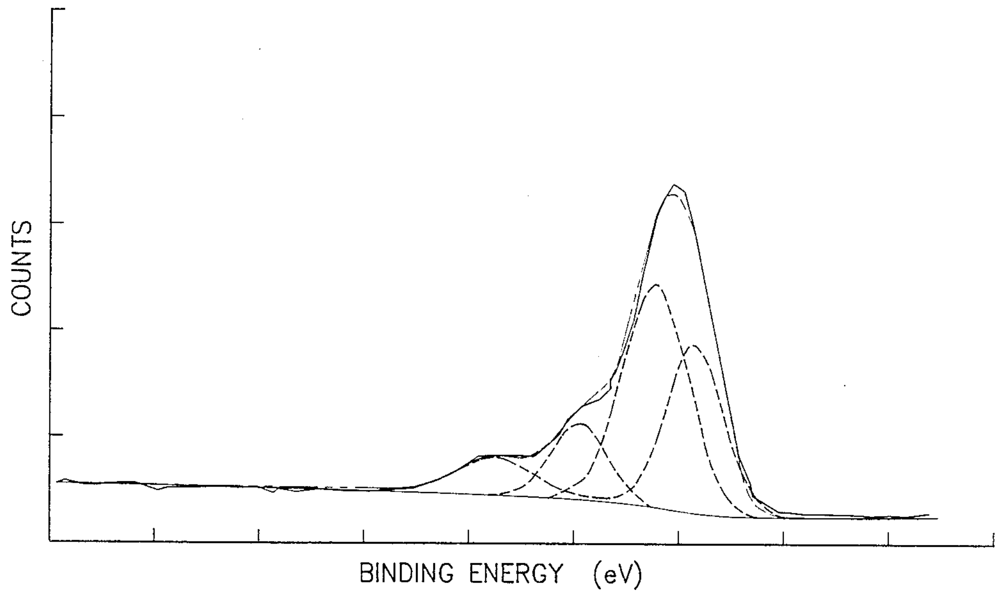

A separate sample of quartz fabric of the same type employed above was treated according to the procedure described in the Bjorklund, et al., U.S. Pat. No. 4,521,450. The following procedure was employed. A 4×4" piece of quartz fabric was dipped into a solution of ferric chloride (10 g) in 0.01 molar hydrochloric acid. While still wet the fabric was placed in liquid pyrrole at ambient temperature. Sample E was placed in the pyrrole solution for 15 minutes, removed, dried and prepared for XPS studies. Sample F was soaked in the pyrrole for 25 minutes and then washed in distilled water prior to drying and preparation for XPS study. The XPS study of the Bjorklund samples is shown in FIGS. 13 and 14. Again, there is considerable disorder of the polymer structure as shown in these figures. The alpha-alpha bonded carbons appear around 284.5 eV and there is considerable contribution to peak asymmetry from higher energy disorder carbons.

Based upon the above XPS spectra analysis, it is clear that the polypyrrole formed by the process of the present invention on the fabrics is much more ordered in its structure than are the fabrics of either Maus or Bjorklund. This is further demonstrated by comparison of the Maus and Bjorklund samples with that of the sample prepared according to the present invention shown in FIG. 9 where no surface is involved and the degree of asymmetry to polymers disorder is clearly seen. It is interesting to note that the Bjorklund sample shown in FIG. 14 showed less asymmetry than the previous Bjorklund sample shown in FIG. 13. Since the Bjorklund sample of FIG. 14 was exposed to the pyrrole solution for a longer period of time, ordering of the top layers of polymer may increase as the coating gets thicker. If, indeed, this is the case then the samples prepared according to the present invention must have a higher degree of order of the initial layers and this order is propagated through the polymer structure.

What is claimed is:

1. An electrically conductive textile material which comprises a textile material made predominantly of fibers selected from polyester, polyamide, acrylic, polybenzimidazole, glass and ceramic fibers; wherein said textile material is covered to a uniform thickness of from about 0.05 to about 2 microns through chemical oxidation in an aqueous solution with a coherent, ordered film of an electrically conductive, organic polymer selected from a pyrrole polymer and an aniline polymer.

2. The textile material of claim 1 wherein said textile material comprises a knitted, woven, or non-woven fibrous textile fabric

3. The textile material of claim 2 wherein said textile fabric is selected from woven or knitted fabrics.

4. The textile material of claim 3 wherein said textile fabric is constructed of continuous filament yarns.

5. The textile material of claim 1 wherein said textile fibers are high modulus fibers selected from aromatic polyester, aromatic polyamide and polybenzimidazole fibers.

6. The textile material of claim 1 wherein said textile fibers are high modulus inorganic fibers selected from glass and ceramic fibers.

7. The textile material of claim 1 wherein said textile fabric has a resistivity of from about 10 to about 500,000 ohms per square.

8. The textile material of claim 1 wherein said textile fibers are basic dyeable polyester fibers.

9. The textile material of claim 1 wherein said textile material is a wound yarn, filament or fiber.

10. The textile material of claim 1 wherein said polypyrrole polymer is made by polymerizing a pyrrole monomer selected from the group consisting of pyrrole, a 3- and 3,4-alkyl or aryl substituted pyrrole, N-alkyl pyrrole and N-aryl pyrrole.

11. The textile material of claim 1 wherein said pyrrole polymer is made by polymerizing a pyrrole monomer selected from pyrrole, N-methylpyrrole, or a mixture of pyrrole and N-methylpyrrole.

12. The textile material of claim 1 wherein said polyaniline polymer is made by polymerizing an aniline compound selected from chloro-, bromo-, alkyl or aryl-substituted aniline.

13. The textile material of claim 1 wherein said ordered film of said electrically conductive, organic polymer is formed by contacting in said aqueous solution the textile material with an oxidatively polymerizable compound selected from a pyrrole compound or an aniline compound and an oxidizing agent capable of oxidizing said compound to a polymer, said contacting being carried out in the presence of a counter ion which imparts electrical conductivity to said polymer, said contacting being under conditions at which the compound and the oxidizing agent react with each other to form a prepolymer in said aqueous solution before either the compound or the oxidizing agent are adsorbed by or deposited on or in the textile material but without forming a conductive polymer per se in said aqueous solution; adsorbing onto the surface of said textile material the forming polymer and allowing the adsorbed forming polymer to polymerize in an ordered configuration while adsorbed on said textile material so as to uniformly and coherently cover the textile material with a conductive, ordered film of said polymer.

* * * * *